(12) United States Patent
Chang et al.

(10) Patent No.: US 8,259,084 B2
(45) Date of Patent: Sep. 4, 2012

(54) EMBEDDED TYPE INDUCTIVE INPUT DISPLAY DEVICE CAPABLE OF INCREASING APERTURE RATIO

(75) Inventors: Hung-Chang Chang, Taipei (TW); Po-Yang Chen, Taipei (TW); Po-Sheng Shih, Taipei (TW)

(73) Assignee: HannStar Display Corporation, Taipei (TW)

( * ) Notice: Subject to any disclaimer, the term of this patent is extended or adjusted under 35 U.S.C. 154(b) by 380 days.

(21) Appl. No.: 12/506,559

(22) Filed: Jul. 21, 2009

(65) Prior Publication Data

US 2010/0171724 A1 Jul. 8, 2010

(30) Foreign Application Priority Data

Jan. 6, 2009 (TW) .............................. 98100220 A

(51) Int. Cl.
*G06F 3/041* (2006.01)

(52) U.S. Cl. ...... 345/173; 345/174; 345/175; 315/169.3

(58) Field of Classification Search .................. 345/173, 345/174, 175; 315/169.3
See application file for complete search history.

(56) References Cited

U.S. PATENT DOCUMENTS

| 2005/0093466 A1* | 5/2005 | Matsumoto ................ 315/169.3 |
| 2009/0002341 A1* | 1/2009 | Saito et al. .................... 345/175 |

* cited by examiner

*Primary Examiner* — Amare Mengistu
*Assistant Examiner* — Insa Sadio
(74) *Attorney, Agent, or Firm* — Muncy, Geissler, Olds & Lowe, PLLC

(57) ABSTRACT

An embedded type inductive input display device capable of increasing aperture ratios, that is realized through parallel-connecting at least two sensing devices of adjacent pixels separated by a gate line, and said sensing devices are connected to a switch transistor, such that said switch transistor is under control of said gate line, and sensor signals output by said sensing devices are transmitted to a read line for detecting touch-control events and positions. As such, the size of said sensing device utilized can be reduced, hereby effectively increasing aperture ratio of a panel, while maintaining a same magnitude of said sensor signals.

5 Claims, 4 Drawing Sheets

EMBEDDED TYPE INDUCTIVE INPUT DISPLAY DEVICE CAPABLE OF INCREASING APERTURE RATIO

BACKGROUND OF THE INVENTION

1. Field of the Invention

The present invention relates to a touch-control display device, and in particular to an embedded type inductive input display device capable of increasing aperture ratios.

2. The Prior Arts

In recent years, touch-control panels are getting popular and are widely utilized, and thus various types of touch-control panels are developed and produced, such as, capacitive type, resistive type, sonic wave type, infrared light type, and in-cell (embedded) type touch-control panels, etc. Wherein, the technology of in-cell (embedded) touch-control panels is getting most of the attentions. Compared with the conventional resistive or capacitive type touch-control panels both requiring additional circuit boards to be installed on the associated display panels, for an in-cell (embedded) touch-control panel, the touch-control function is built-in and incorporated into a display panel without having to install additional circuit boards. Therefore, it is held in high esteem in the industry and is widely utilized.

Presently, most of the in-cell (embedded) touch-control panels are optical sensor type, and that are realized through a sensor unit embedded into a display panel. This kind of sensor unit may include a photo sensor, and that is used to determine a touch-control position & event through detecting the variations of sensor signal. The sensor unit can be a thin-film-transistor (TFT) sensor unit 10, as shown in FIG. 1, and it is composed of a switch transistor 12 and a sensing device, and the sensing device can be a photo transistor 14. When a switch transistor 12 is turned on, the sensor signals generated by a photo transistor 14 are transmitted out through a read line 16, and when the intensity of irradiated lights is changed, the magnitude of sensor signal will be changed correspondingly, and that can be used to determine a touch-control event and find out a touch-control position.

However, in order to reduce the number of IC's utilized in reading signals of sensor signal by half, usually, the above-mentioned touch-control panel is designed to be driven in a time-sharing manner, as shown in FIG. 2. Wherein, the signal read lines 16 of a photo sensor on its left and right portions are connected together by making use of time-sharing driving characteristics, hereby reducing the number of reading IC's required. When a gate line is provided with a turn-on voltage, only the signals of photo sensor on its left or right portions are read out in a horizontal direction, and the photo sensor on the other side of the gate line can not be activated. However, in consideration of the visual effects required, the pixel layout of the same color must be kept the same, thus the area occupied by these non-activated photo sensors can not be eliminated, hereby resulting in the sacrifice of part of its aperture ratio.

In view of the problems and shortcomings of the prior art, the present invention discloses an embedded type inductive input display device, so as to overcome the problems of the prior art.

SUMMARY OF THE INVENTION

A major objective of the present invention is to provide an embedded type inductive input display device capable of increasing its aperture ratio. Wherein, at least two sensing devices located at adjacent gate lines are connected in parallel based on the differences of resolutions of touch-control sensors in a vertical direction, while sharing a common switch transistor. When in operation, the sensor signal is a sum of sensor signal of the respective sensing devices connected in parallel, as such, the size of sensing device can be reduced, therefore, aperture ratio of a panel can be increased while maintaining the same magnitude of sensor signal.

To achieve the above-mentioned objective, the present invention provides an embedded type inductive input display device, comprising: a plurality of gate lines, which include a first gate line and a second gate line; and a plurality of sensor units, with each sensor unit includes at least two sensing devices connected in parallel and a switch transistor, the two sensing devices are located respectively on either side of the first gate line and the second gate line, and are both connected to a common switch transistor. Moreover, the switch transistor is connected to a first gate line and a read line, and is controlled by the first gate line, thus enabling sensing device in outputting sensor signals to the read line.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

In the present invention, a time-sharing driving structure is utilized, so that sensing devices located at adjacent gate lines are connected in parallel in sharing a common switch transistor, such that the size of sensing device utilized can be reduced, thus being able to maintain the original magnitude of sensor signals read out, while increasing aperture ratio of a touch-control panel.

Figure 1:
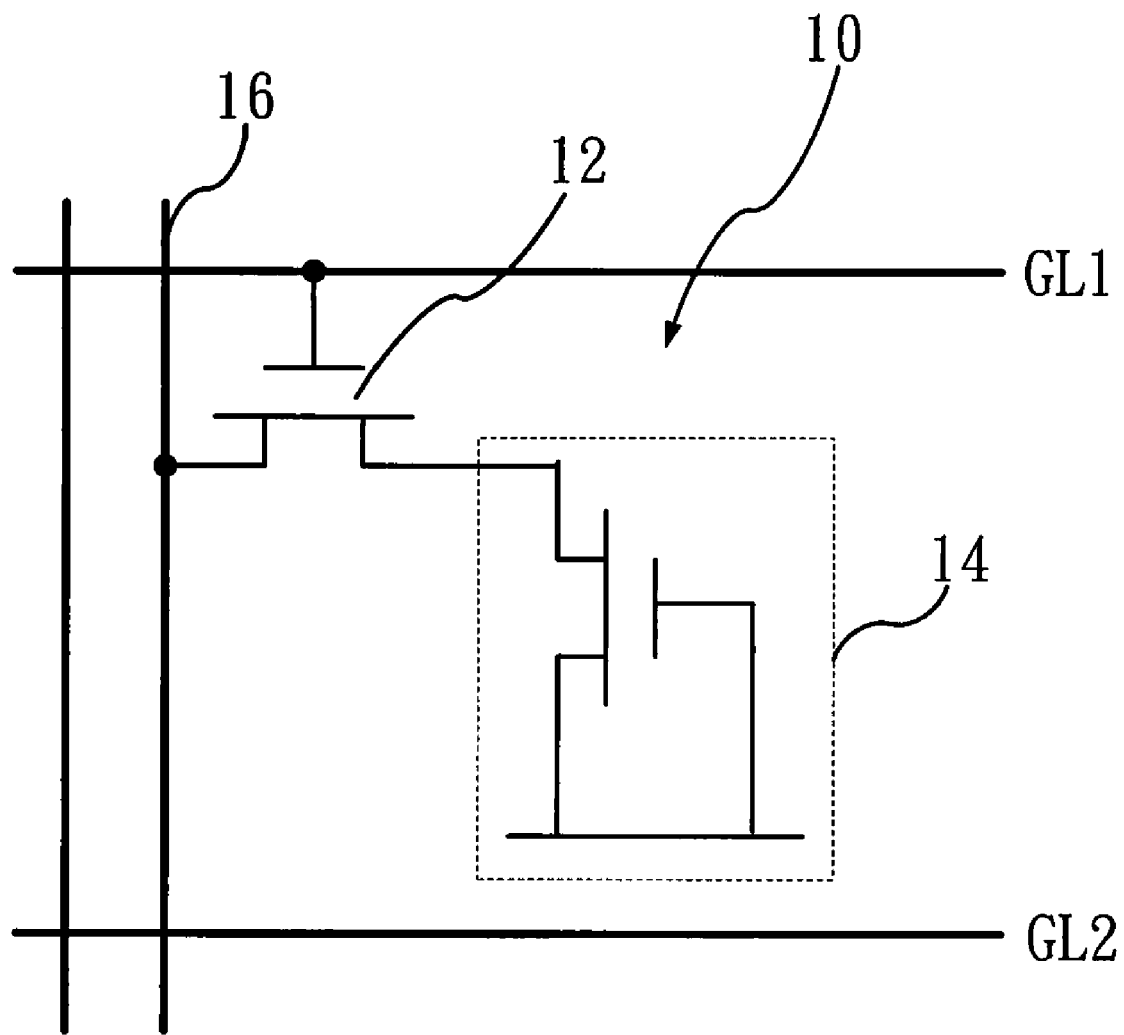
FIG. 1 is a circuit diagram of a sensor unit according to the prior art.
Figure 2:
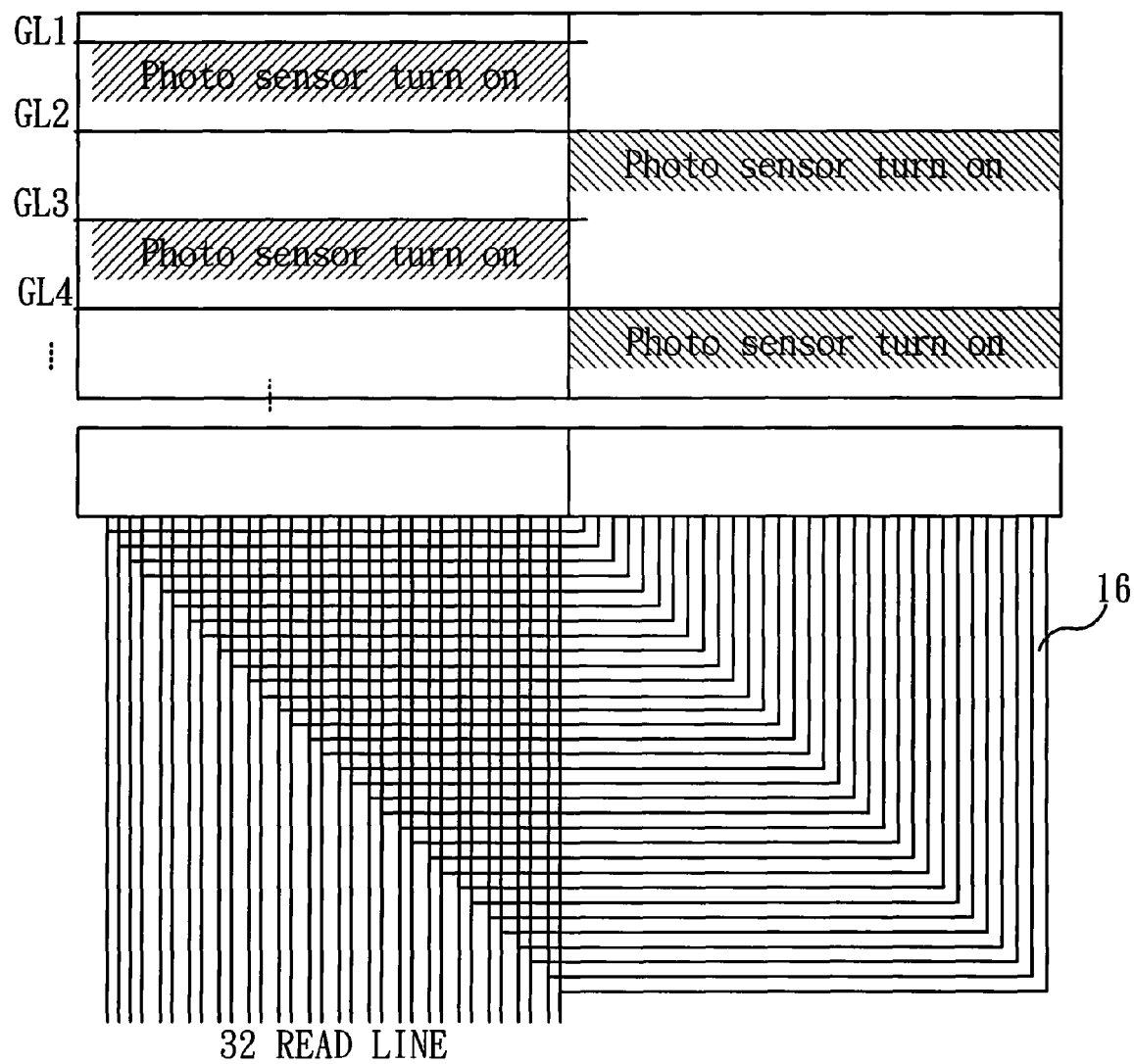
FIG. 2 is a schematic diagram of a read line structure driven in a time sharing manner according to the prior art.
Figure 3:
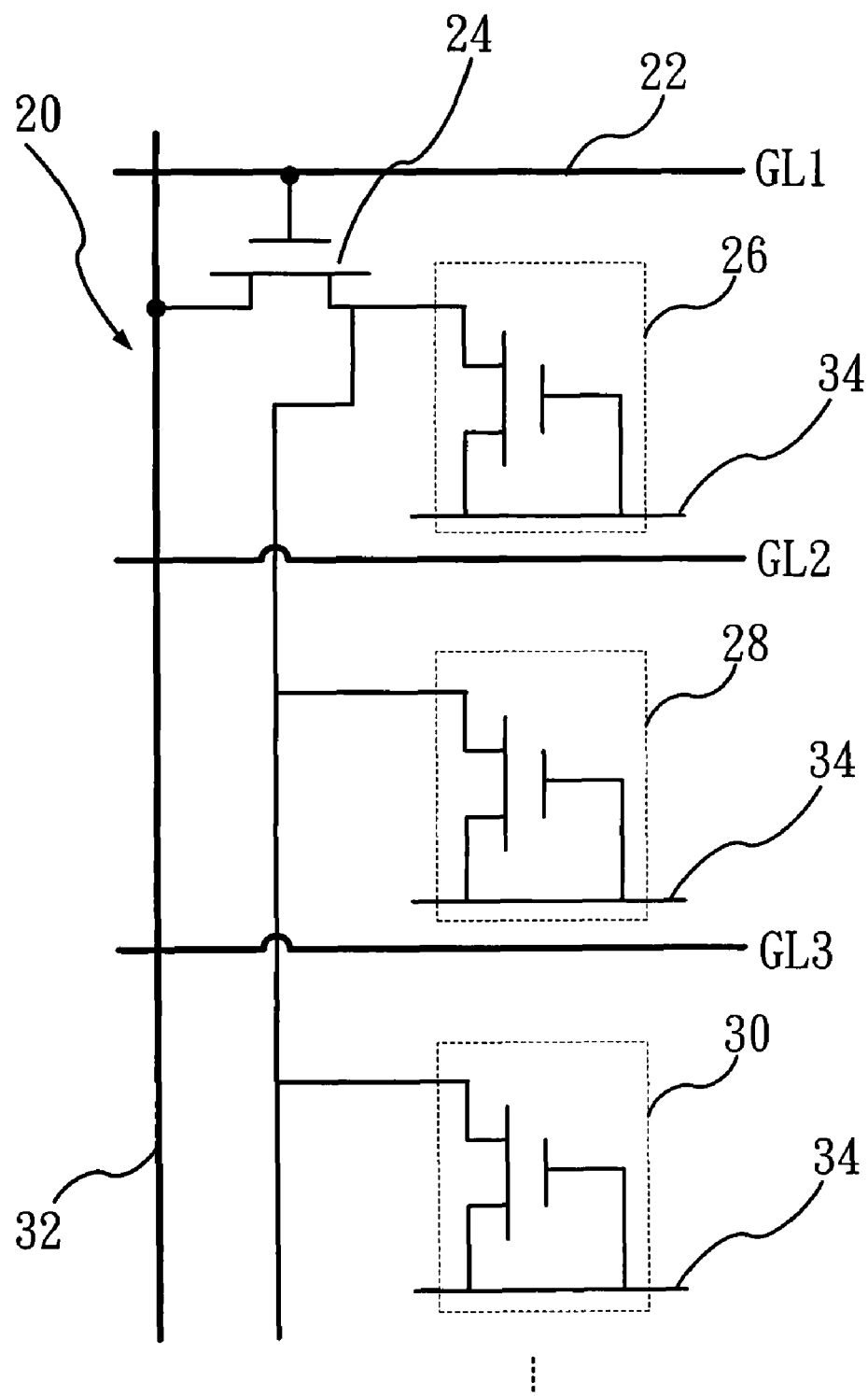
FIG. 3 is a circuit diagram of an embedded type inductive input display device according to an embodiment of the present invention.

Firstly, referring to FIG. 3 for a circuit diagram of an embedded type inductive input display device according to an embodiment of the present invention. As shown in FIG. 3, the embedded type inductive input display device includes a plurality of gate lines 22, as shown as GL1, GL2, and GL3 in the drawing, and a plurality of sensor units 20, with each group of sensor units 20 including a common switch transistor 24, and two or more than two sensing devices. In the present embodiment, three photo transistors serving as sensing devices 26, 28, and 30 are taken as an example, thus according to the design of pixel layouts, sensing devices 26, 28, and 30 are connected in parallel and are placed on one side of gate lines GL1, GL2, and GL3. Furthermore, gate electrodes and source electrodes of sensing devices 26, 28, 30 are all connected to a common electrode 34 for providing a bias voltage, and their drain electrodes are connected to a switch transistor 24. The gate electrode of switch transistor 24 is connected to a gate line GL1, the source electrode of switch transistor is connected to sensing devices 26, 28, and 30, and the drain electrode of switch transistor is connected to a read line 32. In the structure mentioned above, the switch transistor 24 is controlled by the gate line GL1, such that sensing devices 26, 28, and 30 are able to output sensor signals to read line 32, and the sensor signals are received by a read unit (not shown) connected to a read line 32, and are utilized to detect a touch-control event and find out a touch-control position.

In the present embodiment, the switch transistor 24 and the sensing devices 26, 28, and 30 mentioned above are made of ordinary thin-film-transistor (TFT). In addition, the parallel connections of sensing devices 26, 28, and 30 are realized by means of transparent conductive wirings, such as those made of Indium-Tin-Oxide (ITO).

Figure 4:
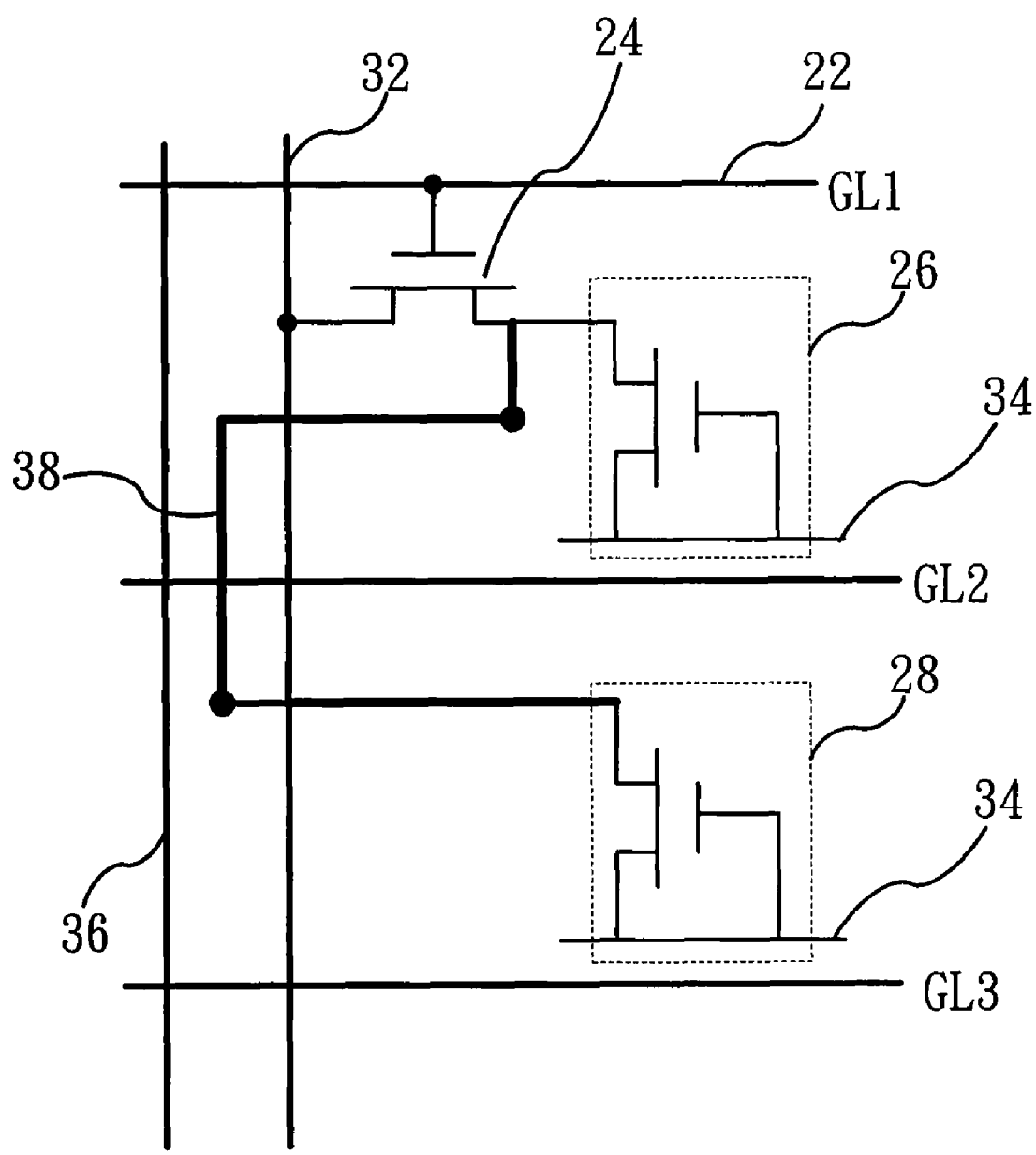
FIG. 4 is a circuit diagram of an embedded type inductive input display device driven in a time sharing manner according to an embodiment of the present invention.

Furthermore, in the present invention, the number of sensing devices connected in parallel can be varied depending on the resolutions of touch-control sensors arranged in a vertical direction. Subsequently, referring to FIG. 4 for a circuit diagram of an embedded type inductive input display device driven in a time sharing manner according to an embodiment of the present invention. As shown in FIG. 4, the space between a data line 36 and a read line 32 can be used to accommodate the transparent conduction wirings 38 in parallel-connecting sensing devices 26 and 28 of two adjacent gate lines GL1 and GL2, and in sharing a common switch transistor 24. Since, originally, the photocurrent of a single sensing device can be detected, in the present invention, two sensing devices 26 and 28 are connected in parallel, so that the area of sensing devices utilized can be effectively reduced, as such, the aperture ratio can be increased, while obtaining sensor signals of the same magnitude.

In the present embodiment mentioned above, the implementation of two sensing devices is taken as an example for explanation. In addition, the number of sensing devices utilized can be varied depending on the resolutions of touch-control sensors in a vertical direction. Furthermore, in addition to the photo sensor such as photo transistor that can be used as sensing device, other sensing devices such as capacitive sensing device or pressure sensing device may also be used to generate sensor signals in cooperation with the structure characteristics mentioned above, hereby achieving the purpose of detecting touch-control events and touch-control positions.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An embedded type inductive input display device, comprising:
   a plurality of gate lines, including a first gate line and a second gate line; and
   a plurality of sensor units, including
      at least two photo transistors of adjacent pixels separated by said second gate line connected in parallel, that are located respectively on opposite sides of said second gate line, gate electrode and source electrode of said photo transistor being directly connected to a common electrode; and
   at least a switch transistor, connected to said first gate line and a read line, a gate electrode of said switch transistor being directly connected to said first gate line, with its source electrode directly connected to a drain electrode of said photo transistor, and with its drain electrode directly connected to said read line, thereby enabling said photo transistors in outputting sensor signals to said read line under the control of said first gate line.

2. The embedded type inductive input display device as claimed in claim 1, further comprising:
   a read unit, connected to said read line for receiving said sensor signals, and then for detecting touch-control events and finding out touch-control positions based on said sensor signals received.

3. The embedded type inductive input display device as claimed in claim 1, wherein
   a number of said photo transistors utilized is varied depending on various different resolutions of touch-control sensors in a vertical direction.

4. The embedded type inductive input display device as claimed in claim 1, wherein
   said photo transistors are connected in parallel together by making use of transparent conduction wirings.

5. The embedded type inductive input display device as claimed in claim 4, wherein said transparent conduction wirings are made of indium-tin-oxide (ITO).

* * * * *